June 30, 1936. H. THOMA Re. 20,026

HYDRAULIC PUMP AND MOTOR

Original Filed Nov. 5, 1931 2 Sheets-Sheet 1

Inventor
Hans Thoma,
Atty.
Frank Ackerman

June 30, 1936. H. THOMA Re. 20,026

HYDRAULIC PUMP AND MOTOR

Original Filed Nov. 5, 1931 2 Sheets-Sheet 2

Hans Thoma,
by Thomas Anderson,
Atty.

Reissued June 30, 1936

Re. 20,026

UNITED STATES PATENT OFFICE 20,026

HYDRAULIC PUMP AND MOTOR

Hans Thoma, Karlsruhe, Germany

Original No. 1,924,629, dated August 29, 1933, Serial No. 573,231, November 5, 1931. Application for reissue January 15, 1935, Serial No. 1,954. In Germany November 13, 1929

16 Claims. (Cl. 103—162)

In hydraulic pumps and engines of the swash-plate type, the construction frequently includes a stationary element or stator having the inlet and exhaust ports formed therein and provided with a plane face through which said ports open. Confronting this plane face is the coacting plane face of a rotary cylinder block having a plurality of cylinders formed parallel to its axis and moving, upon rotation of the block, into and out of registry with said ports in succession. In these cylinders are the usual pistons having rods engaging the swash-plate. Inasmuch as the present invention related solely to the lubrication and prevention of wear on the coacting and confronting faces of the stator and cylinder block or rotor, it is not deemed necessary to show the swash-plate.

It has been found, in hydraulic pumps and motors of this type, working with high pressure and affording high output, that these coacting faces cause difficulties in service as, owing to the excessive forces which press the contacting faces of the stator and of the cylinder block together, either seizing is apt to occur between the faces sliding, the one or the other or a gaping between these faces takes place when the pressing forces become too light.

According to the invention hereinafter described, the coacting faces are so constructed that the cylinder block is automatically in a stable state of equilibrium with respect to the stationary one of the coacting faces, whereby both of the coacting faces are held at a certain slight distance apart. This adjustment of the coacting faces is attained by reason of the fact that there have been provided in the coacting faces, for instance, in the stationary one of the coacting faces, throttling grooves or throttling places by means of which the pressure oil enters in throttled condition pressure spaces provided between the coacting faces. By the damming of the throttled pressure oil in the spaces, strong separative forces become effective which prevent a mutual friction and seizing of the coacting faces. As, however, this pressure oil flows off to the outside through the gap between the two coacting faces, the adjusting can be done in such manner that the pressure conditions between the coacting faces adapt themselves to the stresses from the outside when the quantity of oil flowing through the throttling places is limited, through suitably narrow construction of the throttling grooves, to small values as compared with the quantity of drip oil flowing off to the outside. In this way the following results are obtained:

When, owing to the back-pressure occurring in the gear, the distance between the coacting faces is reduced, the quantity of oil passing through the throttling places and which practically does not change becomes more and more important as compared with the quantity of drip oil flowing out between the coacting faces. The oil pressure in the pressure spaces, consequently, increases to higher and higher values when the distance between the coacting faces becomes smaller and smaller, with the result that a state of stable equilibrium is attained when the coacting faces are a slight distance apart.

An embodiment of the invention is illustrated by way of example in the accompanying drawings, in which—

Figure 1:
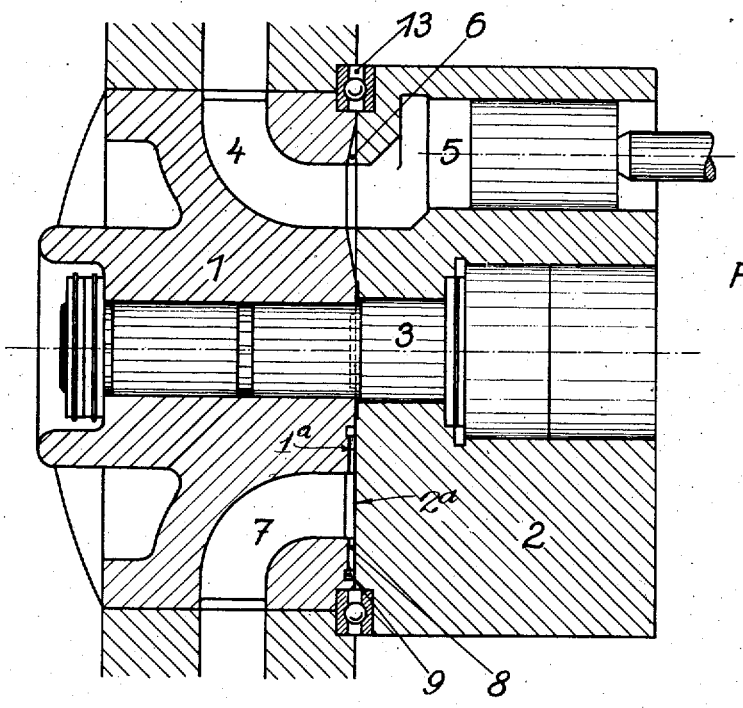
Fig. 1 is a longitudinal vertical section through one form of the invention.

In the construction of the present invention, it is material to produce pressure spaces, fed with oil under pressure between the surface of the stationary element 1 and the coacting face of the rotating cylinder 2, which runs on a journal 3, the coacting faces being shown at $1^a$ and $2^a$ respectively. For this purpose, the simplest method is to employ the oil under pressure working in the apparatus which flows through a port 4. In the case of the primary part (pump) of a driving installation, oil under pressure flows from the cylinder 5 through the port 4 and in the case of a secondary part (hydraulic motor) oil under pressure flows through the port into the cylinder space 5. In the stator face $1^a$, grooves 6 are arranged radially to the port 4, not extending to the edge of the face $1^a$ and having only little depth, i. e. they can be merely scraped. In the drawings these channels are shown deeper for the sake of clearness only. These grooves may be of any desired shape, for example wedge-shaped in longitudinal section (Fig. 1). They may, however, have their sides parallel.

The effect of the grooves is that, in the case of the surfaces of the elements 1 and 2 closely lying one on the other, the oil enters from the port 4 through the grooves 6 into the outer areas of the coacting faces of the device and consequently produces between these faces a separative pressure which counteracts the back pressure from the cylinder spaces. If, however, the pressure increases so that a slight lifting of the cylinder block, amounting to a few hundredths of a millimeter, occurs, the oil commences to flow out of the grooves in outward direction, so that the oil pressure in the grooves drops. This pressure decrease is caused by the oil flowing from the scraped grooves in outward direction, whereas there existed before no flow when the surfaces were tightly pressed the one on the other. Consequently, by the drop of pressure in the grooves, which becomes apparent particularly on the outer edges of the coacting faces 1a and 2a, a reduction of the separative forces acting on the cylinder body becomes apparent during the separation, so that, if the surfaces are suitably chosen, a balanced condition is produced as regards the mutual distance of the coacting faces, this being important for the invention.

If the desired effect is to be produced, it is necessary to select the angle of inclination of the surface at 6 very much smaller than shown in Fig. 1. This construction is not only relatively difficult to produce, but it is further open to the objection that the faces scraped in this manner change their shape, even if only by a few hundredths of a millimeter, in a manner which influences the effect, for example, owing to impurities present in the oil or owing to possible metallic contacting of the coacting faces, during the idle running of the device under the influence of spring pressure.

Figure 2:
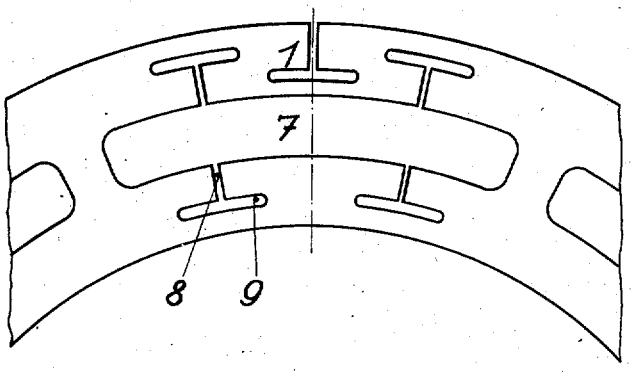
Fig. 2 is a face view of a portion of the stator in a modified form of the invention.

The lower parts of Fig. 1 and Fig. 2 show a further construction of the device, in which the same effect is attained, without the above mentioned objection occurring. In this instance, instead of wedge-shaped recesses, grooves 9 are arranged in the face 1a, which communicate with the port 7 by fine throttling channels 8. It is evident that in this instance, it is assumed that the port 7 is on that side of the device which has the greatest pressure, especially as the arrangement illustrated can be effective on the pressure side of the device only as long as one is limited to the use of oil supplied from the pressure pipe of the device, the device thus being used as a pump with oil drawn in through the port 4 and expelled under pressure through the port 7.

If, in the form of construction illustrated in Fig. 2, the cylinder 2 sits tightly on the face 1a, oil under pressure passes through the throttling channel 8 into the groove 9, so that the oil pressure extends almost to the edge of the coacting faces of the device. Consequently, the oil under pressure is pressed back by the surfaces lying tightly the one on the other at the outer edges, so that with suitably selected dimensions, the cylinder block is moved slightly away from the stator.

However, as soon as this movement of the cylinder block occurs, oil runs out of the grooves 9 in outward direction, and as only a limited quantity of oil can enter from the inner side into the grooves 9, through the fine throttle channels 8 and at the same time also between the coacting faces of the device at the sides of the throttle channels 8, as long as the movement is not considerable, the pressure in the grooves 9 will decrease appreciably and the cylinder will soon come to rest after a movement of a few hundredths of a millimeter, in the event of suitably selected size proportions of the coacting faces and of the throttle channels 8.

This arrangement consequently acts similarly to that with the wedge-shaped scraped grooves shown in Fig. 1 and above described, only with the difference that, according to the construction illustrated in Fig. 2, less wear of the coacting faces occurs without the efficiency of the arrangement being considerably influenced. Consequently, it is possible, without affecting the reliability of service, to employ narrow throttle channels, if these are arranged as shown in Fig. 2, between moved engine elements, i. e. in the coacting faces themselves. If it is desired to also obtain an adjustment of the cross section of the throttle channels 8, this may be attained by a screw valve 8a which controls the throttle channel 8 which is limited on one side by the valve. Experience has shown that as a rule, such an arrangement is, however, not necessary.

Figure 5:
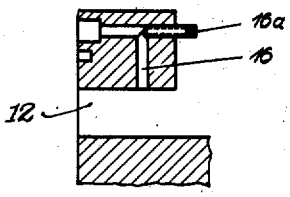
Fig. 5 is a similar view to Fig. 4 but showing a modified valve arrangement.
Figure 6:
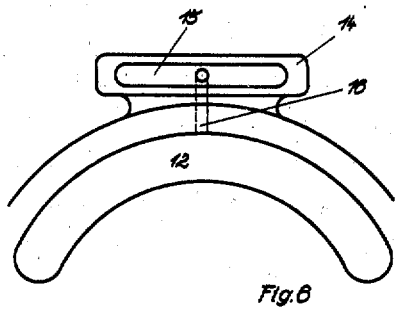
Fig. 6 is a face view from the left of Fig. 5.

The pressure spaces 15 of Figs. 5 and 6 corresponding to the spaces 9 in the previous form, may be arranged either in the surface itself or in separate carrying pads 14, i. e. in radial enlargements of the surfaces. These enlarged portions of the surfaces, if considered necessary, may also be separated from the pressure spaces proper, by continuously or partly extending grooves 12. In such cases, each groove 12 is connected to a corresponding space 15 by a duct or passage 16 controlled by a needle valve 16a. Thus, the spreading of the inner oil pressure of the gearing on the bearing surfaces is prevented, which may be advantageous under certain circumstances.

Figure 7:
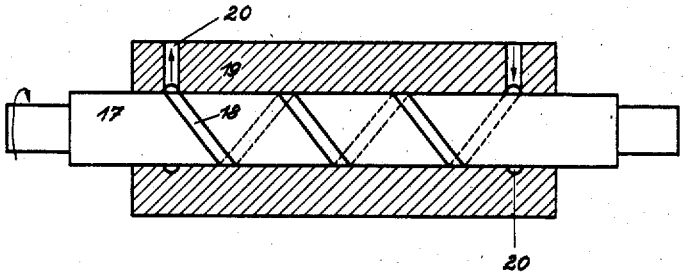
Fig. 7 is a longitudinal section, partly in elevation, of a viscosity pump hereinafter mentioned.

The arrangements illustrated also possess the property that they only work when the device has sufficient pressure at least on one side. If necessary, the carrying pads arranged on the other side of the device might be supplied with oil through a pair of check valves. However, in many instances, it may be preferable to take the pressure oil for supplying the grooves in the supporting pads not from the pressure space of the device, but to employ therefor a separate pump, which must be capable of feeding a certain quantity of pressure oil to each carrying pad, it being important that this quantity of pressure oil does not reduce too much in the event of pressure occurring in the carrying pad. If, for this purpose, one of the known viscosity pumps is chosen, the advantage is further obtained, that such a pump is as a rule more efficient with more viscous oil, so that a greater lifting off of the cylinder from the cooperating surface occurs when the running oil is viscous at cold temperature. A typical well known form of such pump is shown in Fig. 7 wherein a cylindrical casing 19 having inlet and outlet ports 20 holds a revolving cylinder 17 which is provided with a helical groove 18 serving to force liquid from the inlet to the outlet port. The grooves may also terminate in separate pressure spaces 9, as shown in Fig. 1.

This viscosity pump effect occurs also in the radially arranged grooves because these are continually under the action of the revolving cylinder surface, so that therefore the oil is pressed at a sufficiently high pressure into the pressure spaces 9, closed at first, until the pressure finally becomes so high, that the one surface lifts off slightly, whereupon a reduction of the oil pressure immediately occurs.

The result of this viscosity pump effect is, that the feeding of the pressure spaces can be carried out also without supplying pressure oil, that is the relieving takes place for example also when the pressure oil does not flow through the channels 4 or 7 to the cylinders, but flows out of the cylinder spaces practically free from pressure. In any case, the size of the packing gap is automatically adjusted to that necessary for the most favorable effect on the device at different oil temperatures and widely variable viscosity of the service oil.

In the case of viscous oil, the distance between the revolving cylinder face 2ᵃ and the stationary slide face 1ᵃ must be greater than with very liquid oil, as in the case of viscous oil, the grooves, acting as a viscosity pump, can convey greater quantities of oil or oil quantities under higher pressure than with very liquid oil, or higher oil temperature, the distance between the slide and cylinder faces being invariable.

Controls for devices equipped with this arrangement really show that the increase in leakage oil at certain working pressure and increasing temperature is much less than might be expected according to the actually very great decrease of viscosity at increased temperature. As the quantity of leakage oil with constant working pressure and constant temperature increases at increasing revolving speed, it may be concluded that in the case of increasing revolving speed, the oil fed by the viscosity pump increases and thus a stronger lifting off of the running surface is effected.

However, this is very advantageous in that, at a lower revolving speed, the oil circulation is slight in such devices, whereas the pressure is mostly high, so that small dimensions of the gap between the slide and the cylinder surfaces are desirable, especially as the oil friction is immaterial at this point. On the other hand, the oil circulation increases at higher speeds, so that greater quantities of leakage oil can be taken into account without detriment, especially if thereby a relieving of the packing faces is obtained.

Figure 3:
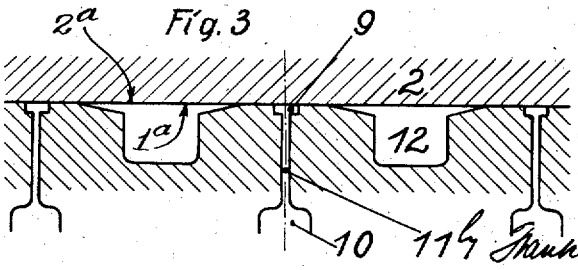
Fig. 3 is a section on the arc of a circle passing through the ports in a third form of the invention.

Instead of the wedge-shaped operating viscosity pump, other known shapes may be employed, for example spiral grooves in rotating shafts or sleeves. Instead of supplying the oil to the control surfaces directly from the operating channels, the feed may also be carried out through the intermediary of throttle channels (Fig. 3). In this case, the pressure spaces 9 communicate with the oil feed 10 through the throttle channels 11. Turbulent flowing of the oil current then occurs in the throttle channels 11, whereas contrary thereto the oil throttling in the radial gaps 6 and 8 always takes place lineally. This results in that the quantities of oil flowing over from the throttle channels 11 into the pressure space 9 is not proportional to the quotient from working pressure and viscosity of the oil, but that it increases very slightly, as the viscosity drops, and, in the extreme case of purely turbulent throttling, is even independent of the viscosity. In any case, the employment of turbulent forms of flow results in that the proportion of the pressure drops in the throttle channels 11 and in the pressure space 9, assuming that the distance between 1 and 2 remains constant, is dependent upon the temperature in the sense that, at increased temperature, the revolving cylinder 2 must approach the slide face 1, in order to again establish the same pressure condition in the pressure spaces 9 and consequently the equilibrium of the forces on the cylinder.

Fig. 3 shows the arrangement of separate discharge channels 12 into which the oil under pressure flows over from the spaces 9 when the cylinder surface 2ᵃ moves away from the face 1ᵃ.

For assisting the effect by which particularly a seizing of the surfaces running the one on the other is avoided, the relieving of direct contact may be by ball bearings 13 (Fig. 1) which are placed, for example, in the form of a ball bearing ring between the faces.

This arrangement presents the advantage that the faces approach during the gradual wearing of the ball bearings. An improvement of the device is automatically attained thereby, and in this manner the wearing of the ball bearings, which takes place very slowly, is utilized to produce in continuous service an automatic uniform adjustment of the running surfaces.

The construction of the coacting surfaces may also be evidently employed in other, for example, plane control surfaces or gear elements, thus for example when the coacting surfaces are arranged on a cylinder or on a cone-shaped casing.

Figure 4:
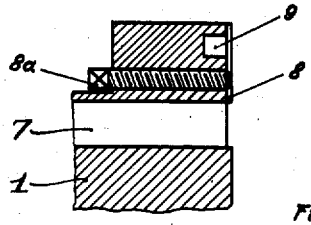
Fig. 4 is a detail section through a portion of the stator showing valve means as used for controlling certain passages therein.

It will be noted that in each case the throttling conduit (whether the "throttling channel" or groove 8, shown in Figs. 1, 2, and 4, or the throttling duct or passage 11 in Fig. 3 or the throttling "duct or passage" 16 shown in Figs. 5 and 6) serves to conduct fluid under pressure to depressions (such as the "grooves" 9 in Figs. 1, 2, and 4 or the "pressure space" 9 in Fig. 3 or the "pressure space" 15 in Figs. 5 and 6) and that, as a result of the limited carrying capacity of said throttling conduits, the pressure in said depressions is automatically controlled so as to assure adequate pressure to keep the surfaces separated and at the same time reducing the leakage of oil through the space between the coacting surfaces to a minimum in the manner described above.

I claim:

1. In a device of the kind described, a stator provided with a plane face and having inlet and outlet ports opening through said face, one of said ports being for fluid under pressure, a cylinder block having a plane face abutting and coacting with the stator face, said cylinder block having a plurality of cylinders formed therein and opening by ports through said plane face, and pistons in said cylinders, said stator having grooves in its plane face extending radially beyond the peripheries of the cylinder ports from the port containing fluid under pressure, said stator further having pressure grooves formed in its plane face in spaced relation to the pressure port and having said grooves opening into the pressure grooves.

2. In a device of the kind described, a stator provided with a plane face and having inlet and outlet ports opening through said face, one of said ports being for fluid under pressure, a cylinder block having a plane face abutting and coacting with the stator face, said cylinder block having a plurality of cylinders formed therein and opening by ports through said plane face, and pistons in said cylinders, said stator having grooves in its plane face extending radially beyond the peripheries of the cylinder ports from the port containing fluid under pressure, said grooves having constricted portions forming throttling gaps between the pressure grooves and said port, said stator further having pressure grooves formed in its plane face in spaced relation to the pressure port and having said grooves opening into the pressure grooves.

3. In a device of the kind described, a stator provided with a plane face and having inlet and outlet ports opening through said face, one of said ports being for fluid under pressure, a cylinder block having a plane face abutting and coacting with the stator face, said cylinder block having a plurality of cylinders formed therein and opening by ports through said plane face, pistons in said cylinders, said stator having grooves in its plane face extending radially beyond the peripheries of the cylinder ports from the port containing fluid under pressure, said stator further having pressure grooves formed in its plane face in spaced relation to the pressure port and having said grooves opening into the pressure grooves, and a ball bearing ring interposed between the stator and cylinder faces and surrounding said pressure grooves whereby oil from the pressure grooves will lubricate said ball bearing.

4. In a device of the kind described, a stator provided with a plane face and having inlet and outlet ports opening through said face, one of said ports being for fluid under pressure, a cylinder block having a plane face abutting and coacting with the stator face, said cylinder block having a plurality of cylinders formed therein and opening by ports through said plane face, pistons in said cylinders, said stator having grooves in its plane face extending radially beyond the peripheries of the cylinder ports from the port containing fluid under pressure, said stator further having pressure grooves formed in its plane face in spaced relation to the pressure port and having said grooves opening into the pressure grooves, said grooves having constricted portions forming throttling gaps between the pressure grooves and said port, and a ball bearing ring interposed between the stator and cylinder faces and surrounding said pressure grooves whereby oil from the pressure grooves will lubricate said ball bearing.

5. In a device of the kind described, a stator provided with a plane face and having inlet and outlet ports opening through said face, one of said ports being for fluid under pressure, a cylinder block having a plane face abutting and coacting with the stator face, said cylinder block having a plurality of cylinders formed therein which open by ports through said plane face, and pistons in said cylinders, said stator being formed with depressions in its plane face in spaced relation to said pressure port and throttling grooves extending from said pressure port to each of said depressions, whereby fluid under pressure is maintained in said depressions.

6. In a device of the kind described, a stator provided with a plane face and having inlet and outlet ports opening through said face, one of said ports being for fluid under pressure, a cylinder block having a plane face abutting and coacting with the stator face, said cylinder block having a plurality of cylinders formed therein which open by ports through said plane face, and pistons in said cylinders, said stator being formed with depressions in its plane face in spaced relation to said pressure port and throttling conduits extending from said pressure port to each of said depressions whereby fluid under pressure is maintained in said depressions.

7. In a device of the kind described, a stator provided with a plane face and having inlet and outlet ports opening through said face, one of said ports being for fluid under pressure, a cylinder block having a plane face abutting and coacting with the stator face, said cylinder block having a plurality of cylinders formed therein which open by ports through said plane face, and pistons in said cylinders, said stator being formed with depressions in its plane face in spaced relation to said pressure port and throttling conduits extending from said pressure port to each of said depressions, and adjustable means for varying the area of said throttling conduits.

8. In a device of the kind described, a stator having inlet and outlet ports formed therein, one of said ports being for fluid under pressure, a cylinder block bearing against said stator, said cylinder block having a plurality of cylinders formed therein which open by ports toward said stator and cooperate with said inlet and outlet ports, pistons in said cylinders and means for operating said pistons, said stator being formed with depressions therein in spaced relation to the pressure port and throttling conduits leading from said pressure port to said depressions, whereby fluid under pressure is maintained in said depressions.

9. In a device of the kind described, a stator having inlet and outlet ports formed therein, one of said ports being for fluid under pressure, a cylinder block bearing against said stator, said cylinder block having a plurality of cylinders formed therein which open by ports toward said stator and cooperate with said inlet and outlet ports, pistons in said cylinders and means for operating said pistons, said stator being formed with depressions therein in spaced relation to the pressure port and throttling conduits leading from said pressure port to said depressions, and adjustable means for varying the area of said throttling conduits.

10. In a device of the character described, a stator, a rotating member bearing against said stator, said stator being formed with a depression therein facing toward said rotating member, a source of fluid under pressure and a conduit leading from said fluid source to said depression, said conduit being of relatively restricted area so as to throttle the flow of liquid therethrough.

11. In a device of the character described, a stator, a rotating member bearing against said stator, said stator being formed with a depression therein facing toward said rotating member, a source of fluid under pressure and a conduit leading from said fluid source to said depression, said conduit being of relatively restricted area so as to throttle the flow of liquid therethrough and adjustable means for varying the resistance to flow of liquid through said conduit.

12. In a device of the character described, a stator member, a rotating member bearing against said stator member, one of said members being formed with a depression therein facing toward said other member, a source of fluid under pressure, and a throttling conduit leading from said fluid source to said depression.

13. In a device of the character described, a stator member, a rotating member bearing against said stator member, one of said members being formed with a depression therein facing toward said other member, a source of fluid under pressure, and a throttling conduit leading from said fluid source to said depression, and adjustable means for varying the resistance to flow of liquid through said conduit.

14. In a device of the character described, coacting and abutting means comprising a stator and a cylinder block, said stator having inlet and outlet ports formed therein and said cylinder block having a plurality of cylinders formed therein which open by ports toward said stator and cooperate with said inlet and outlet ports, pistons in said cylinders and means for operating said pistons, one of said coacting means being formed with depressions therein in spaced relation to said ports and conduits leading from said ports to said depressions, a portion of said conduit being of restricted area so as to throttle the flow of liquid there-through.

15. In a device of the character described, coacting and abutting means comprising a stator and a cylinder block, said stator having inlet and outlet ports formed therein and said cylinder block having a plurality of cylinders formed therein which open by ports toward said stator and cooperate with said inlet and outlet ports, pistons in said cylinders and means for operating said pistons, one of said coacting means being formed with throttling conduits leading from said ports and serving to deliver fluid between said coacting and abutting means.

16. In a device of the character described, a stator member, a rotating member bearing against said stator member, a source of fluid under pressure, one of said members being formed with a throttling conduit leading from said fluid source and serving to deliver fluid between said members.

HANS THOMA.